United States Patent
Schweid et al.

(10) Patent No.: US 9,641,726 B1
(45) Date of Patent: May 2, 2017

(54) MULTI-INK VECTOR HALFTONING USING MULTI-BIT VECTOR HALFTONING METHODS

(71) Applicant: Xerox Corporation, Norwalk, CT (US)

(72) Inventors: Stuart A. Schweid, Pittsford, NY (US); David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/148,384

(22) Filed: May 6, 2016

(51) Int. Cl.
*H04N 1/52* (2006.01)
*H04N 1/60* (2006.01)
*G06K 15/10* (2006.01)
*B41J 2/21* (2006.01)

(52) U.S. Cl.
CPC .............. *H04N 1/52* (2013.01); *B41J 2/2121* (2013.01); *G06K 15/102* (2013.01); *H04N 1/6008* (2013.01); *H04N 1/6066* (2013.01); *H04N 2201/0094* (2013.01)

(58) Field of Classification Search
None
See application file for complete search history.

(56) References Cited

U.S. PATENT DOCUMENTS

| | | |
|---|---|---|
| 5,673,121 A | 9/1997 | Wang |
| 6,161,919 A | 12/2000 | Klassen |
| 6,250,733 B1 | 6/2001 | Yao et al. |
| 6,295,137 B1 | 9/2001 | Balasubramanian |
| 6,373,594 B1 | 4/2002 | Yao et al. |
| 7,095,530 B2 | 8/2006 | Mantell et al. |
| 7,369,276 B2 | 5/2008 | Couwenhoven et al. |
| 7,457,015 B2 | 11/2008 | Snyder et al. |
| 7,508,558 B2 | 3/2009 | Yao et al. |
| 8,040,567 B2 | 10/2011 | Hosaka et al. |
| 8,077,332 B2 | 12/2011 | Kroon et al. |
| 8,294,964 B2 | 10/2012 | He |
| 8,632,149 B2 | 1/2014 | Xie |
| 8,681,383 B2 | 3/2014 | Wang et al. |
| 8,928,937 B2 | 1/2015 | Mantell |

(Continued)

OTHER PUBLICATIONS

Paula Žitinski Elias, "Halftoning for Multi-Channel Printing—Algorithm Development, Implementation and Verification", Copyright © 2014, Department of Science and Technology, Campus Norrköping, Linköping University Sweden, pp. 1-130.

(Continued)

*Primary Examiner* — Christopher D Wait
(74) *Attorney, Agent, or Firm* — Gibb & Riley, LLC

(57) ABSTRACT

According to exemplary methods, a print job including an electronic document having a color image is received into a computerized device having a marking device including a print engine. A sheet of the print job is analyzed by the computerized device. In the analysis, a contone of the color image is converted to multi-bit output using multi-level vector halftoning. Pairs of complementary colors are selected, and substitute color channels for drop sizes are determined for each pair of complementary colors. Binary vector halftoning is applied using the substitute color channels for each pair of complementary colors. It is determined if ink is to be printed for the complementary colors. Multi-level processing is applied to determine an amount of ink for one color of each of the pairs of complementary colors. Pixels of the color image are rendered using the ink amount for the color of the pair of complementary colors.

23 Claims, 6 Drawing Sheets

(56) References Cited

U.S. PATENT DOCUMENTS

2003/0179410 A1  9/2003  Velde
2004/0080762 A1  4/2004  Kroon
2006/0279753 A1  12/2006 Yao et al.
2007/0024651 A1  2/2007  Snyder et al.

OTHER PUBLICATIONS

Qing Yu et al., "Stochastic Screen Halftoning for Electronic Imaging Devices", Department of Electrical Engineering University of Rochester, Rocheste, NY 14627, pp. 1-32.

MULTI-INK VECTOR HALFTONING USING MULTI-BIT VECTOR HALFTONING METHODS

BACKGROUND

Systems and methods herein generally relate to machines having print engines such as printers and/or copier devices and, more particularly, to printer color management in image/text printing or display systems.

The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK), defines a "color space" that includes all colors that can result from any combination of these primaries. The "color space," or "color gamut," may be quite different for different sets of primaries. In forming multi-color output images on an image-receiving medium, each of the primary colors is transferred to the image-receiving medium in turn. The color gamut is defined by the interaction of the primary colors, and is limited by a total amount of colorant in any combination that can be effectively deposited on the image-receiving medium. In other words, it is not possible to print some colors that can be photographed or displayed on a monitor when using CMYK printing. The color gamut for a particular image forming device and an associated color rendition dictionary (CRD) by which images may be produced by the image forming device is usually stored in metadata with the image forming device. The CRD and associated set of set points programmed into the image forming device, or family of image forming devices, ensures that the color gamut produced by that image forming device covers an available standard color spectrum. Typically then, image forming devices are delivered with a single CRD available in the image production system.

In multi ink applications additional color inks are added to extend gamut. In such cases, there are typically colors that are complimentary; that is, they have hue angles that are roughly 180 degrees apart. This is typical since these additional colors are used to extend the 4-color gamut and to produce a color that is outside those reachable using solely CMYK. For example, typical secondary colors, such as a deep red (complementary to cyan), which is a combination of magenta and yellow, are very hard to reach. The same if often true of green (complementary to magenta) and blue (complementary to yellow). For complementary colors, the presence of both colors tends to produce a neutral hue, so it is not necessary for gamut extension, the primary use of these additional colors, to use the complementary inks simultaneously; complementary inks, therefore, tend be used mutually exclusive of each other. The mutual exclusiveness of the complementary ink pairs is a loose restriction. There are areas of color space where both inks might be present as the color management transitions from use of one ink to the other. However, both inks are not significantly present at the same time.

SUMMARY

Systems and methods herein enable a solution to the multi-ink (more than 4) vector halftoning problem using multi-level drop size vector halftoning. First, a CMYK contone is converted to multi-bit (e.g. 2 bit-per-pixel (2 bpp)) output, where each state of the output corresponds to a different commanded drop size of an ink jet nozzle. Methods herein recognize that near complementary colors will never be printed at the same pixel (i.e., red and cyan will not be assigned at the same pixel) such that the complementary colors can be treated as different drop sizes of a single color. Therefore, the value of the single color for halftoning purposes is made a function of both the original color and its complement.

Accordingly, the benefits of vector halftoning are preserved in the 7-color system. A hybrid system (such as vector CMYK and scalar RGB), which is substandard, is not needed.

According to exemplary methods herein, a print job is received into a computerized device comprising a marking device. The print job comprises an electronic document comprising a color image. The marking device comprises a print engine. A sheet of the print job is analyzed by the computerized device. In the analysis, a contone of the color image is converted to multi-bit output using multi-level vector halftoning. Pairs of complementary colors are selected, and substitute color channels for ink drop sizes are determined for each of the pairs of complementary colors. Binary vector halftoning is applied using the substitute color channels for each of the pairs of complementary colors. It is determined if ink is to be printed for the complementary colors. Multi-level processing is applied to determine an amount of ink for one color of each of the pairs of complementary colors. Pixels of the color image are rendered using the amount of ink for the color of the pair of complementary colors.

According to exemplary methods herein, a contone of a color image is converted to multi-bit output using multi-level vector halftoning. Pairs of complementary colors are selected, and substitute color channels for ink drop sizes are determined for each of the pairs of complementary colors. Binary vector halftoning is applied using the substitute color channels for each of the pairs of complementary colors. It is determined if ink is to be printed for the complementary colors. Multi-level processing is applied to determine an amount of ink for one color of each of the pairs of complementary colors. Pixels of the color image are rendered using the amount of ink for the color of the pair of complementary colors.

Printers herein include a print engine receiving color values for each color to be printed for a plurality of pixels. The printer includes printheads ejecting ink onto an image receiving surface and a processor connected to the print engine. The processor generates firing signals to operate the printheads to eject the ink onto the image receiving surface. The print engine receives a print job comprising an electronic document comprising a color image. The processor converts a contone of the color image to multi-bit output using multi-level vector halftoning. The processor selects pairs of complementary colors, and determines substitute color channels for drop sizes for each of the pairs of complementary colors. The processor applies binary vector halftoning using the substitute color channels for each of the pairs of complementary colors. The processor determines if ink is to be printed for the complementary colors. The processor applies multi-level processing to determine an amount of ink for one color of each of the pairs of complementary colors. The print engine renders pixels of the color image using the amount of ink from the printheads for the color of the pair of complementary colors.

According to a computer system for multi-level halftoning of multiple colors, the computer system comprises a program product comprising a tangible computer readable storage medium having program code embodied therewith.

The program code is readable and executable by a computer to provide an application to perform a method. According to the method, a print job is received into a computerized device comprising a marking device. The print job comprises an electronic document comprising a color image. The marking device comprises a print engine. A sheet of the print job is analyzed by the computerized device. In the analysis, a contone of the color image is converted to multi-bit output using multi-level vector halftoning. Pairs of complementary colors are selected, and substitute color channels for ink drop sizes are determined for each of the pairs of complementary colors. Binary vector halftoning is applied using the substitute color channels for each of the pairs of complementary colors. It is determined if ink is to be printed for the complementary colors. Multi-level processing is applied to determine an amount of ink for one color of each of the pairs of complementary colors. Pixels of the color image are rendered using the amount of ink for the color of the pair of complementary colors.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

Figure 1:
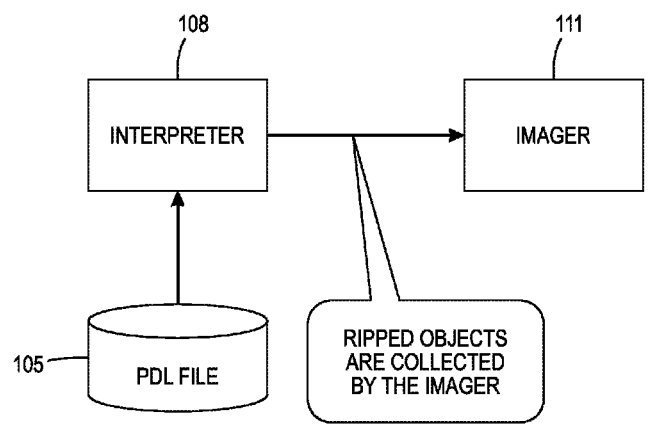
FIG. 1 is a flow diagram illustrating a broad overview of a process according to systems and methods herein.

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

As used herein, an image forming device can include any device for rendering an image on print media, such as a copier, laser printer, bookmaking machine, facsimile machine, or a multifunction machine (which includes one or more functions such as scanning, printing, archiving, emailing, and faxing). "Print media" can be a physical sheet of paper, plastic, or other suitable physical print media substrate for carrying images. A "print job" or "document" is referred to for one or multiple sheets copied from an original print job sheet(s) or an electronic document page image, from a particular user, or otherwise related. An original image is used herein to mean an electronic (e.g., digital) or physical (e.g., paper) recording of information. In its electronic form, the original image may include image data in a form of text, graphics, or bitmaps.

As shown FIG. 1, an incoming job may include a PDL file 105 that describes the appearance of a printed page according to the job. The input may be a page description using a page description language (PDL). A page description language (PDL) is a computer language that describes for the print engine the appearance of a printed page in a higher level than an actual output bitmap. The PDL file 105 specifies the arrangement of the printed page through commands for the print engine. An interpreter 108 may be used in a preprocessing step to interpret a specified number of job pages.

An exemplary processing system may include an interpreter 108 and an imager 111, as shown in FIG. 1. The interpreter 108 and imager 111 are classic components of a two-part raster image processor (RIP), such as may be used to prepare the job for printing. As would be known by one skilled in the art, a raster image processor is a component used in a printing system that produces a raster image, also known as a bitmap. The bitmap is then sent to a printing device for output. Raster image processing is the process that turns the job input information into a high-resolution raster image. The input may be a page description using a page description language (PDL) of higher or lower resolution than the output device. In the latter case, the RIP applies either smoothing or interpolation to the input bitmap to generate the output bitmap.

According to systems and methods herein, the interpreter parses the PDL file 105 according to PDL-specific language constructs, and changes these into pdl-language neutral "objects" that are presented to the imager 111 for collection. In this way, various language-specific interpreters can be mated with a single imager implementation.

To print an image, a print engine processor, sometimes referred to herein as an image processor, converts the image in a page description language or vector graphics format to a bit mapped image indicating a value to print at each pixel of the image. Each pixel may represent a dot, also called a picture element. The sequence of dots forming a character is called a raster pattern. The number of dots per inch that a printer generates is called the print resolution, or density. A resolution of 240 pixels means that a printer prints 240 pixels per inch both vertically and horizontally, or 57,600 pixels per square inch (240×240).

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

The basic imaging technique in jet printing involves the use of one or more ink jet assemblies connected to a pressurized source of ink. Each individual ink jet includes a very small orifice, usually of a diameter of 10 to 200 microns, which is energized by magneto restrictive piezoelectric means for the purpose of emitting a continuous stream of uniform droplets of ink. This stream of uniform droplets is desirably directed onto the surface of a moving web of, for example, paper; and is controlled to form printed characters in response to signals derived from an electronic character generator and in response to an electrostatic deflection system; or drop on demand ink propulsion system.

Drop on demand ink jet technology for producing printed media has been employed in commercial products such as printers, plotters, and facsimile machines. Generally, an ink jet image is formed by selective placement on a receiver surface of ink drops emitted by a plurality of drop generators implemented in a printhead or a printhead assembly. For example, the printhead assembly and the receiver surface are caused to move relative to each other, and drop generators are controlled to emit drops at appropriate times, for example by an appropriate controller. The receiver surface can be a transfer surface or a print medium such as paper. In the case of a transfer surface, the image printed thereon is subsequently transferred to an output print medium such as paper.

The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK), defines a "color space" that includes all colors that can result from any combination of these primaries. The "color space," or "color gamut," may be quite different for different sets of primaries. In forming multi-color output images on an image-receiving medium, each of the primary colors is transferred to the image-receiving medium in turn. The color gamut is defined by the interaction of the primary colors, and is limited by a total amount of colorant in any combination that can be effectively deposited on the image-receiving medium. In other words, it is not possible to print some colors that can be photographed or displayed on a monitor when using CMYK printing. The color gamut for a particular image forming device and an associated color rendition dictionary (CRD) by which images may be produced by the image forming device is usually stored in metadata with the image forming device. The CRD and associated set of set points programmed into the image forming device, or family of image forming devices, ensures that the color gamut produced by that image forming device covers an available standard color spectrum. Typically then, image forming devices are delivered with a single CRD available in the image production system.

Figure 2:
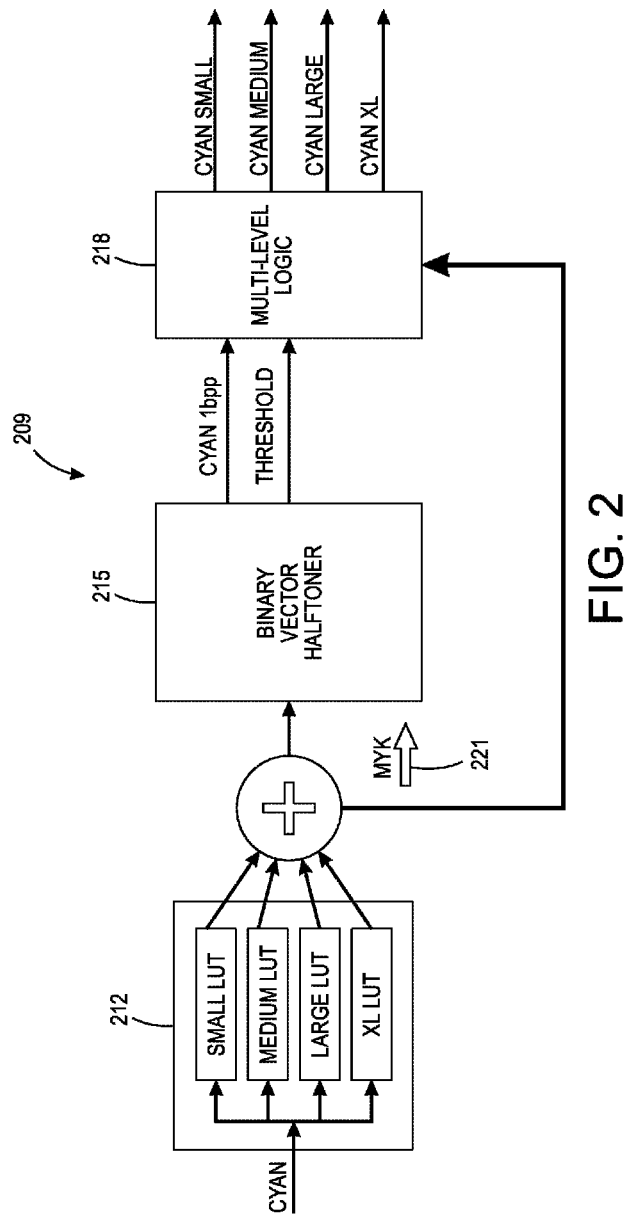
FIG. 2 is a flow diagram illustrating operation of a multi-level halftoner according to systems and methods herein.

Referring to FIG. 2, a multi-level halftoner, indicated generally as 209, produces more than 1 bit per pixel for a contone input using cyan, magenta, yellow, and black (CMYK). The multi-level halftoner 209 is useful for printing light areas with small drops of ink and darker areas with larger drops of ink so that smoothness and a large gamut are both realized FIG. 2 illustrates multi-level halftoning for a single color, which provides four drop sizes: small, medium, large, and extra large. The multi-level halftoning is performed in three stages: conversion of the contone to 4 different command drop sizes 212 using look up tables (LUTs), single bit vector halftoning 215, and conversion to the desired level based on the multi-level logic block 218. The overall transformation is shown in FIG. 2 for cyan, and is identically repeated for all the colors, i.e., magenta, yellow, and black, as shown at 221. That is, the multi-level halftoner 209 performs conversion of the contone to 4 different command drop sizes 212 for each of the CMYK colors.

The output of the multi-level halftoner 209 for cyan at every pixel includes four levels corresponding to: no drop, a small drop, a medium drop, a large drop, or an extra-large drop. These outcomes are mutually exclusive, as they command an ink jet nozzle to create a drop of a particular size, and at every location only one possible size can be jetted.

Alternately, the levels can correspond to the output of multiple nozzles. For example, one printhead configuration can use pairs of nozzles to print small and medium sized drops at the same pixel. The first level thus corresponds to printing a small drop out of one of the nozzles and the second level correspond to printing a medium sized drop out of the other nozzle. The large level can then be the combination of the small and medium drops printed at the same pixel location. Other combinations can correspond to multiple pixels and so on.

Unlike typical halftoning where each separation is independently rendered to binary or multi-bit, the vector halftoner renders a CMYK image making a combined decision for how to binarize each of the four colors. This allows direct control of several features, such as the amount and type of color overlap. For more than four colors the process is extremely complex, as the number of color combinations grows exponentially. This makes direct extension of the process unfeasible for applications that utilize more than four colors (such as 7 color printers).

In multi ink applications, there are typically colors that are complimentary; i.e., they have hue angles that are roughly 180 degrees apart. This is typical since these additional colors are used to extend the 4-color gamut and to produce a color that is outside those reachable using solely CMYK. For example, typical secondary colors, such as a deep red (complementary to cyan), which is a combination of magenta and yellow, are very hard to reach. The same if often true of green (complementary to magenta) and blue (complementary to yellow). Other secondary colors can include orange and purple, for example.

For complementary colors the presence of both colors tends to produce a neutral hue, so it is not necessary for gamut extension, the primary use of these additional colors, to use the complementary inks simultaneously; complementary inks, therefore, tend be used mutually exclusive of each other. The mutual exclusiveness of the complementary ink pairs is a loose restriction, however. There are areas of color space where both inks might be present as the color management transitions from use of one ink to the other. However, both inks are not significantly present at the same time.

This near mutual exclusiveness allows the two inks to seamlessly occupy different level slots of the multi-level halftoner. Recall that the halftoner is designed so that, at most, only one drop size is produced. If two complementary colors are assigned to different levels, they are never printed together at the same location. It does, however, allow both colors to be printed for a given color, just not at the same pixel location.

By sharing a single color slot the advantages of the color halftoner that controls dot overlap is maintained: the relationship between cyan and magenta overlap is controllable, as is now the overlap between red and green.

Figure 3:
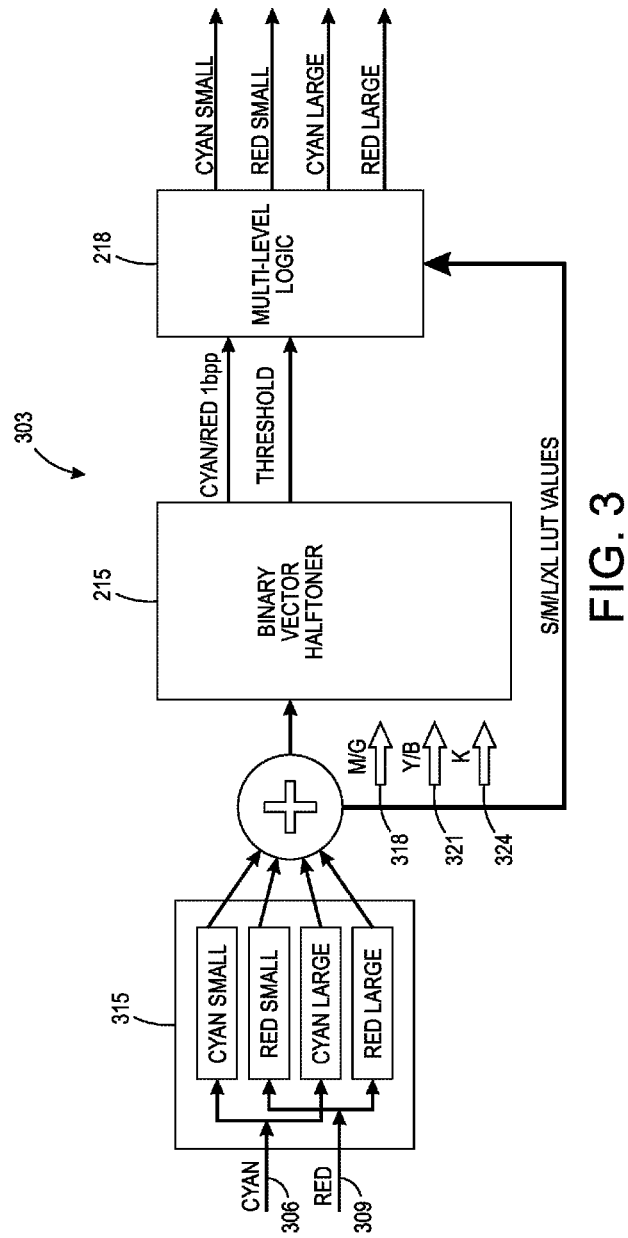
FIG. 3 is a flow diagram illustrating operation of a multi-level halftoner according to systems and methods herein.

As shown in FIG. 3, cyan 306 and red 309 share a single channel 312 of the vector halftoner 215, but different drop size slots, as indicated at 315. Cyan may have a small drop (Cyan Small) and a large drop (Cyan Large), and Red may have a small drop (Red Small) and a large drop (Red Large). The same is can be done for complementary colors magenta/green and yellow/blue. Note the path for black remains unchanged (as there is no complement). FIG. 3 shows the multi-level halftoner, indicated generally as 303, in a modified form, according to systems and methods herein. The modification allows for the conversion from multi-level halftoning to multi-color halftoning using 7 colors. The primary colors are associated with the larger levels so they will preferentially be used with the other primaries for creation the normal type of secondary colors. The drop size channel substitution is identically repeated for each pair of complementary colors, i.e., magenta/green, as indicated at 318, and yellow/blue, as indicated at 321. Black is maintained as a 4 channel input, as indicated at 324.

Occasionally, customers or other end-users of an individual image forming device, or family of image forming devices, may desire to produce and/or reproduce, on a recurring basis, a color or set of colors that lies outside the nominal color gamut available or that does not have hue angles that are roughly 180 degrees apart. In some cases, colors that are not secondary colors, such as gold, white, and silver, can be added to the black channel. Note that in this case, more than a pair of colors (e.g., white, silver, or gold, and black) may be used. For purposes of this disclosure white, silver, and gold can be to be considered complimentary to black, which ideally does not have a hue angle.

As shown in FIG. 2, there are four colors coming out of the multi-level halftoner 209, each having 4 possible drop sizes. In the modified configuration shown in FIG. 3, there are six colors from the multi-level halftoner 303, each having two possible drop sizes. The seventh color is black, which still has 4 possible drop sizes. Note that vector halftoning 215 is modified since the identification of the amount distributed to each of the levels is dependent on the input color values. This simple modification is small and easily implemented—requiring summing the additional input colors within their respective color channels and at the back end reinterpreting the output of the multi-level logic block 218 to the appropriate color outputs for each drop size of the complementary colors.

Figure 4:
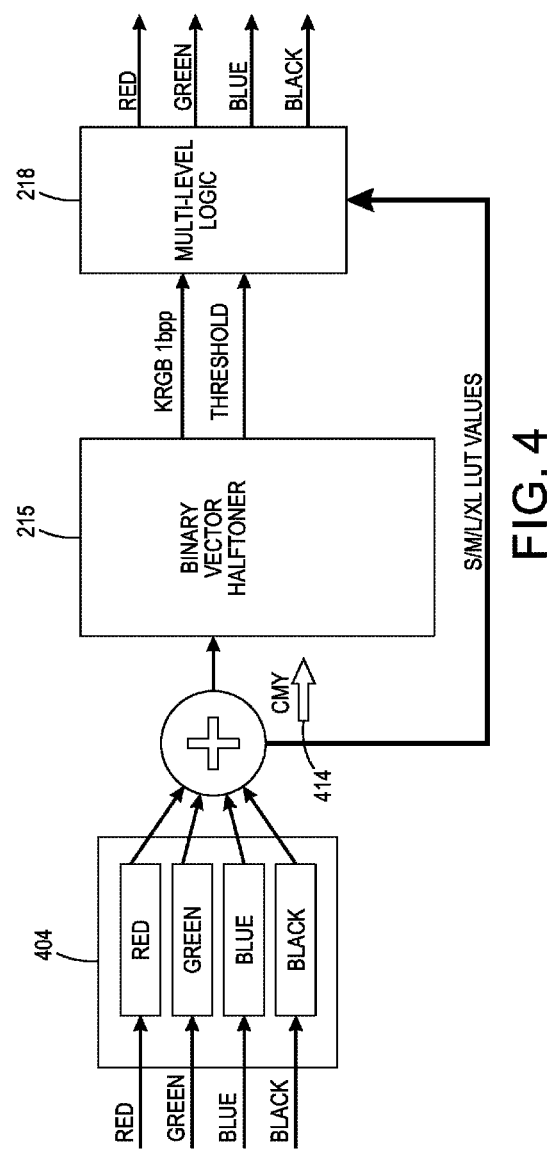
FIG. 4 is a flow diagram illustrating operation of a multi-level halftoner according to systems and methods herein.

Referring to FIG. 4, a similar but alternative option can be used when only binary outputs are required. Instead of using the complimentary color approach within the C, M, and Y channels, as described above, the additional colors are used within the black color channel. That is, each drop size slot, at 404, is used by a separate color: red, green, blue, and black. The black channel is the sum of the CMY colors, as indicated at 414.

While an example of a single use of binary vector halftoning is described herein, it is contemplated that multiple iterations of the binary vector halftoning may be performed. In such a case, processing is similar to a single multi-level halftoning implementation and within the scope of the process of multi-level vector halftoning.

Figure 5:
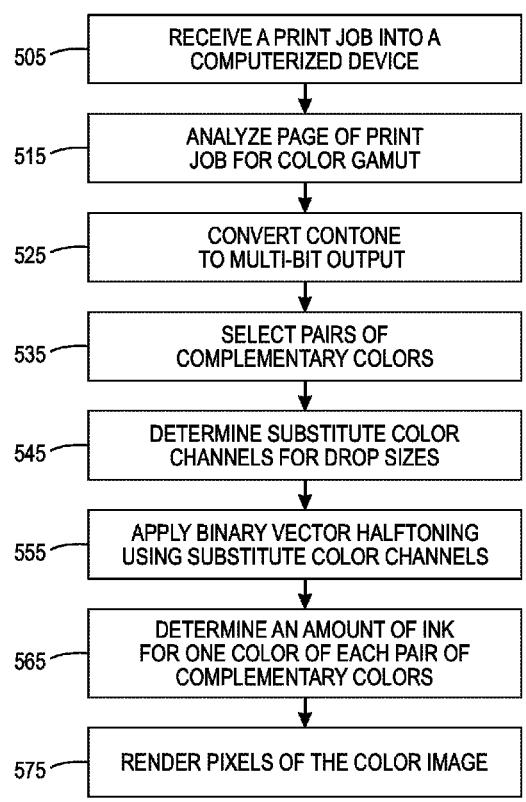
FIG. 5 is a flow chart according to methods herein.

FIG. 5 is a flow diagram illustrating the processing flow of an exemplary method according to the present disclosure. The method is useful for multi-level halftoning of multiple colors. At 505, a print job is received into a computerized device comprising a marking device. The print job comprises an electronic document and print job attributes for the electronic document. The electronic document comprises a color image. The marking device comprises a print engine using a color gamut comprising cyan, yellow, magenta, red, green, blue, and black. The computerized device analyzes a page of the print job for the color gamut, at 515. According to the analysis a contone of the color image is converted to multi-bit output using multi-level vector halftoning, at 525. Each state of the multi-bit output corresponds to a different commanded drop size of an ink jet nozzle for pixels of the color image. Pairs of complementary colors are selected, at 535. Determine substitute color channels for drop sizes for each of the pairs of complementary colors, at 545. At 555, binary vector halftoning is applied using the substitute color channels for each of the pairs of complementary colors. At 565, an amount of ink for one color of each of the pairs of complementary colors is determined, based on the binary vector halftoning. Pixels of the color image are rendered, at 575, using the amount of ink for the color of the pair of complementary colors.

Figure 6:
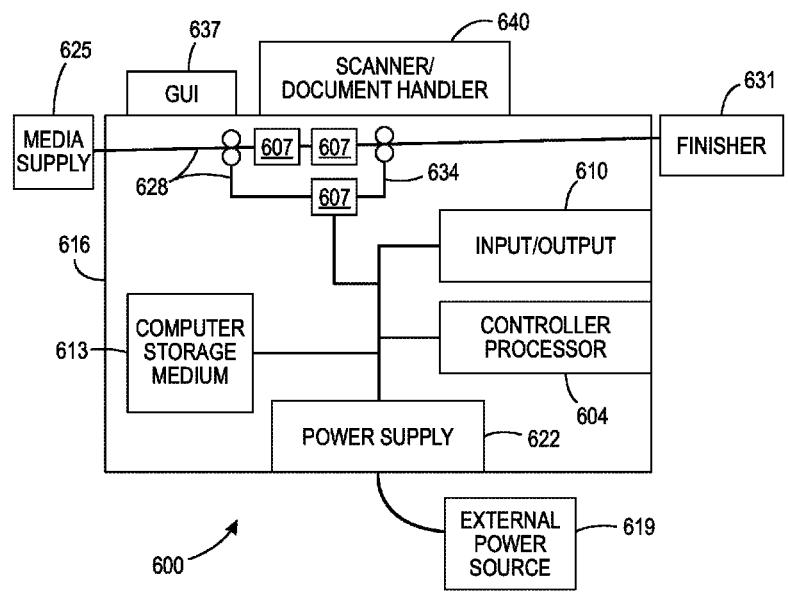
FIG. 6 is a side-view schematic diagram of a multi-function device according to systems and methods herein.

Referring now to FIG. 6, what is illustrated is an exemplary multi-function device (MFD) 600, which can be used with methods herein. The MFD 600 includes a controller/processor 604 and at least one marking device (print engine(s)) 607 operatively connected to the controller/processor 604. The MFD 600 may also include a communications port (Input/Output device 610) operatively connected to the controller/processor 604 and to a computerized network external to the MFD 600. The Input/Output device 610 may be used for communications to and from the MFD 600.

The controller/processor 604 controls the various actions of the MFD 600, as described below. A non-transitory computer storage medium device 613 (which can be optical, magnetic, capacitor based, etc.) is readable by the controller/processor 604 and stores instructions that the controller/processor 604 executes to allow the MFD 600 to perform its various functions, such as those described herein.

According to systems and methods herein, the controller/processor 604 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the multi-function device 600 is special purpose machine that includes a specialized image processing card having unique ASICs for providing color image processing, includes specialized boards having unique ASICs for input and output devices to speed network communications processing, a specialized ASIC processor that performs the logic of the methods described herein using dedicated unique hardware logic circuits, etc. It is contemplated that the controller/processor 604 may comprise a raster image processor (RIP). A raster image processer uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

Thus, as shown in FIG. 6, a body housing 616 has one or more functional components that operate on power supplied from an external power source 619, which may comprise an alternating current (AC) power source, through the power supply 622. The power supply 622 can comprise a power storage element (e.g., a battery) and connects to the external power source 619. The power supply 622 converts the power from the external power source 619 into the type of power needed by the various components of the MFD 600.

The multi-function device 600 herein has a media supply 625 supplying media to a media path 628. The media path 628 can comprise any combination of belts, rollers, nips, drive wheels, vacuum devices, air devices, etc. The print engine 607 is positioned along the media path 628. That is, the multi-function device 600 comprises a document-processing device having the print engine 607. The print engine 607 prints marks on the media. After receiving various markings from the print engine(s) 607, the sheets of media can optionally pass to a finisher 631 which can fold, staple, sort, etc., the various printed sheets. As described herein, a return paper path 634 may deliver the printed sheets to the same or different print engine 607 for at least a second layer of toner to be applied. Each return of the media to the print engine 607 is referred to herein as a "pass".

The print engine(s) 607 may include a color ink applying component (i.e., a source of pigmented toner) that supplies at least pigmented colorant for applying colored ink to the media passing through the print engine 607.

In addition, the multi-function device 600 can include at least one accessory functional component, such as a graphic user interface (GUI) assembly 637 or other accessory functional component (such as a scanner/document handler 640, automatic document feeder (ADF), etc.) that operate on the power supplied from the external power source 619 (through the power supply 622).

As would be understood by those ordinarily skilled in the art, the multi-function device 600 shown in FIG. 6 is only one example and the systems and methods herein are equally applicable to other types of devices that may include fewer components or more components. For example, while a limited number of print engines and media paths are illustrated in FIG. 6, those ordinarily skilled in the art would understand that many more paper paths and additional print engines could be included within any device used with embodiments herein.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device. An image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

That is, as described above, a printing system comprises a multi-function device 600 having a controller/processor 610 that processes a print job according to an original print job description. The controller/processor 610 comprises an image processor component. The original print job description comprises multiple color channels. At least one print engine 607 is connected to the image processor portion of the controller/processor 610. The print engine 607 comprises multiple pigmented ink applying components rendering color layers on a media sheet. The image processor component determines ink usage per pixel for each color channel. The image processor component calculates adjusted ink drop values for complementary color channels. Each state of the multi-bit output corresponds to a different commanded drop size. The controller/processor 610 processes instructions to select pairs of complementary colors and determine substitute color channels for drop sizes for each of the pairs of complementary colors. Binary vector halftoning is applied using the substitute color channels for each of the pairs of complementary colors and an amount of ink for one of the colors of each of the pairs of complementary colors is determined, based on the binary vector halftoning. The pixels of a color image are rendered onto the media sheet using the print engine 607 according to the amount of ink for the color of the pair of complementary colors.

Figure 7:
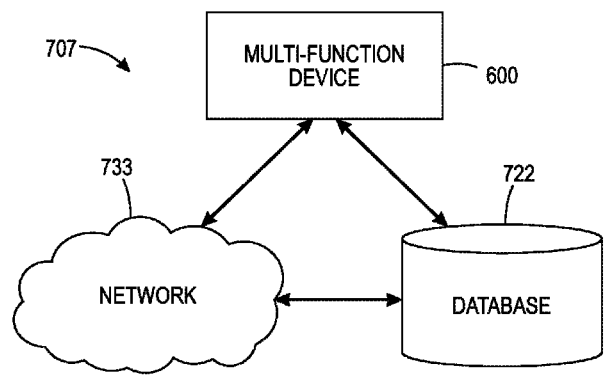
FIG. 7 is a block diagram of a network according to systems and methods herein.

FIG. 7 is a general overview block diagram of a network, indicated generally as 707, for communication between the multi-function device 600 and a database 722. The multi-function device 600 may comprise any form of processor as described in detail above. The multi-function device 600 can be programmed with appropriate application software to implement the methods described herein. Alternatively, the multi-function device 600 is a special purpose machine that is specialized for processing image data and includes a dedicated processor that would not operate like a general purpose processor because the dedicated processor has application specific integrated circuits (ASICs) that are specialized for the handling of image processing operations, processing pixel data, etc. In one example, the multi-function device 600 is special purpose machine that includes a specialized card having unique ASICs for providing image processing instructions, includes specialized boards having unique ASICs for input and output devices to speed network communications processing, a specialized ASIC processor that performs the logic of the methods described herein (such as the processing shown in FIG. 5) using dedicated unique hardware logic circuits, etc.

Database 722 includes any database or any set of records or data that the multi-function device 600 desires to retrieve. Database 722 may be any organized collection of data operating with any type of database management system. The database 722 may contain matrices of datasets comprising multi-relational data elements.

The database 722 may communicate with the multi-function device 600 directly. Alternatively, the database 722 may communicate with the multi-function device 600 over network 733. The network 733 comprises a communication network either internal or external, for affecting communication between the multi-function device 600 and the database 722. For example, network 733 may comprise a local area network (LAN) or a global computer network, such as the Internet.

As used herein, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, an RBG-to-YCbCr converter to obtain luminance (Y) and chrominance (Cb, Cr) values. It should be appreciated that pixels may be represented by values other than RGB or YCbCr.

To render an image is to reduce the image data (or a signal thereof) to viewable form; store the image data to memory or a storage device for subsequent retrieval; or communicate the image data to another device. Such communication may take the form of transmitting a digital signal of the image data over a network.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the processes/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIG. 5. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 2.

The computer program instructions may be stored in a computer readable medium that can direct a computer, other programmable data processing apparatus, or other devices to process in a particular manner, such that the instructions stored in the computer readable medium produce an article of manufacture including instructions which implement the process/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the processes/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various processes if with various programs installed therein.

In the case where the above-described series of processing is implemented with software, the program that constitutes the software may be installed from a network such as the Internet or a storage medium such as the removable medium.

Those skilled in the art would appreciate that the storage medium is not limited to a peripheral device having the program stored therein, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the computer storage medium may be a hard disk, or the like, which has the program stored therein and is distributed to the user together with the device that contains them.

The hardware described herein plays a significant part in permitting the foregoing method to be performed, rather than function solely as a mechanism for permitting a solution to be achieved more quickly, (i.e., through the utilization of a computer for performing calculations). Specifically, printers, scanners, and image processors that alter electronic documents each play a significant part in the methods (and the methods cannot be performed without these hardware elements). Therefore, these hardware components are fundamental to the methods being performed and are not merely for the purpose of allowing the same result to be achieved more quickly.

As would be understood by one ordinarily skilled in the art, the processes described herein cannot be performed by human alone (or one operating with a pen and a pad of paper) and instead such processes can only be performed by a machine. Specifically, processes such as printing, scanning, electronically altering documents using an image processor, etc., require the utilization of different specialized machines. Therefore, for example, the printing/scanning performed by the user device cannot be performed manually (because it can only be done by printing and scanning machines) and is integral with the processes performed by methods herein. In other words, these various machines are integral with the methods herein because the methods cannot be performed without the machines (and cannot be performed by humans alone).

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a 'circuit', 'module, or 'system.' Furthermore, aspects of the present disclosure may take the form of a computer program product embodied in one or more computer readable medium(s) having computer readable program code embodied thereon.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, print engines, etc., are well known, and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terminology used herein is for the purpose of describing particular examples of the disclosed structures and methods and is not intended to be limiting of this disclosure. For example, as used herein, the singular forms 'a', 'an', and 'the' are intended to include the plural forms as well, unless the context clearly indicates otherwise. Additionally, as used herein, the terms 'comprises', 'comprising', and/or 'including', when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

The corresponding structures, materials, acts, and equivalents of all means or step plus process elements in the claims below are intended to include any structure, material, or act for performing the process in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method comprising:
   receiving a print job into a computerized device comprising a marking device, said print job comprising an electronic document comprising a color image, said marking device comprising a print engine;
   analyzing, by said computerized device, a sheet of said print job, said analyzing comprising:
      converting a contone of said color image to multi-bit output using multi-level vector halftoning,
      selecting pairs of complementary colors, and determining substitute color channels for ink drop sizes for each of said pairs of complementary colors,
      applying binary vector halftoning using said substitute color channels for each of said pairs of complementary colors,
      determining if ink is to be printed for said complementary colors, and
      applying multi-level processing to determine an amount of ink for one color of each of said pairs of complementary colors; and
   rendering pixels of said color image using said amount of ink for said one color of said pair of complementary colors.

2. The method according to claim 1, said multi-level vector halftoning determining the size for drops of ink at each pixel location based on color intensity at said pixel location, printing light areas of said color image with small drops of ink and darker areas of said color image with larger drops of ink.

3. The method according to claim 1, each state of said multi-bit output corresponding to a different drop size of an ink jet nozzle for each pixel location of said color image.

4. The method according to claim 3, said drop size comprising one of:
   small,
   medium,
   large, and
   extra large,
   based on said multi-level halftoning.

5. The method according to claim 1, said print engine using a color gamut comprising cyan, yellow, magenta, red, green, blue, and black.

6. The method according to claim 1, said pairs of complementary colors comprising colors having a hue angle approximately 180° apart.

7. The method according to claim 6, said pairs of complementary colors comprising one of:

cyan and red,
magenta and green, and
yellow and blue.

8. The method according to claim 1, said pairs of complementary colors comprising black and one of white, silver, and gold.

9. The method according to claim 1, said determining substitute color channels for ink drop sizes for each of said pairs of complementary colors treating complementary colors as different drop sizes of a single color.

10. A method, comprising:
converting a contone of a color image to multi-bit output using multi-level vector halftoning;
selecting pairs of complementary colors, and determining substitute color channels for ink drop sizes for each of said pairs of complementary colors;
applying binary vector halftoning using said substitute color channels for each of said pairs of complementary colors;
determining if ink is to be printed for said complementary colors;
applying multi-level processing to determine an amount of ink for one color of each of said pairs of complementary colors; and
rendering pixels of said color image using said amount of ink for said one color of said pair of complementary colors.

11. The method according to claim 10, said multi-level vector halftoning determining the size for drops of ink at each pixel location based on color intensity at said pixel location, printing light areas of said color image with small drops of ink and darker areas of said color image with larger drops of ink.

12. The method according to claim 10, each state of said multi-bit output corresponding to a different drop size of an ink jet nozzle for each pixel location of said color image.

13. The method according to claim 10, said pairs of complementary colors comprising colors having a hue angle approximately 180° apart.

14. The method according to claim 13, said pairs of complementary colors comprising one of:
cyan and red,
magenta and green, and
yellow and blue.

15. The method according to claim 10, said pairs of complementary colors comprising black and one of white, silver, and gold.

16. The method according to claim 10, said determining substitute color channels for ink drop sizes for each of said pairs of complementary colors treating complementary colors as different drop sizes of a single color.

17. A printer, comprising:
a print engine receiving color values for each color to be printed for a plurality of pixels, printheads ejecting ink onto an image receiving surface; and
a processor connected to said print engine, said processor generating firing signals to operate said printheads to eject said ink onto said image receiving surface,
said print engine receiving a print job comprising an electronic document and print job attributes for said electronic document, said electronic document comprising a color image,
said processor converting a contone of said color image to multi-bit output using multi-level vector halftoning,
said processor selecting pairs of complementary colors, and determining substitute color channels for ink drop sizes for each of said pairs of complementary colors,
said processor applying binary vector halftoning using said substitute color channels for each of said pairs of complementary colors,
said processor determining if ink is to be printed for said complementary colors,
said processor applying multi-level processing to determine an amount of ink for one color of each of said pairs of complementary colors, and
said print engine rendering pixels of said color image using said amount of ink from said printheads for said color of said pair of complementary colors.

18. The printer according to claim 17, each state of said multi-bit output corresponding to a different drop size and color of ink jet nozzles for each pixel location of said color image.

19. The printer according to claim 17, said print engine using a color gamut comprising cyan, yellow, magenta, red, green, blue, and black.

20. The printer according to claim 17, said pairs of complementary colors comprising one of:
cyan and red,
magenta and green, and
yellow and blue.

21. The printer according to claim 17, said pairs of complementary colors comprising black and one of white, silver, and gold.

22. The printer according to claim 17, further comprising:
a computer storage medium, said processor determining substitute color channels for ink drop sizes for each of said pairs of complementary colors by treating complementary colors as different drop sizes of a single color.

23. The printer according to claim 17, further comprising:
an image input source providing said print job.

* * * * *